United States Patent [19]

Kelsey

[11] 4,325,272

[45] Apr. 20, 1982

[54] METHOD OF MAKING SAW BLADES

[75] Inventor: Robert D. Kelsey, Halfway, England

[73] Assignee: Bramah Stainless Products Limited, Sheffield, England

[21] Appl. No.: 950,740

[22] Filed: Oct. 11, 1978

[51] Int. Cl.$^3$ ............................................. B23D 65/02
[52] U.S. Cl. ..................................................... 76/112
[58] Field of Search ........................................... 76/112

[56] References Cited

FOREIGN PATENT DOCUMENTS 1903840  9/1969  Fed. Rep. of Germany ........ 76/112

Primary Examiner—James G. Smith
Assistant Examiner—Roscoe V. Parker
Attorney, Agent, or Firm—Lowe, King, Price & Becker

[57] ABSTRACT

A method of manufacturing a circular saw blade comprises advancing through a press tool having multiple blanking stations, a blank, in strip form of thickness required for the blades and of width slightly greater than the diameter required for the blades, and having the physical characteristics required of the blades, effecting a first blanking operation at a first blanking station to blank out leading edges of non-consecutive teeth simultaneously with trailing edges of preceding adjacent teeth, advancing the strip to at least one subsequent blanking station and blanking out identical edges of some or all of the remaining teeth, advancing the strip to a further blanking station and forming outer edges on some or all of the teeth and blanking a center hole and a drive hole at one of the stations.

8 Claims, 7 Drawing Figures

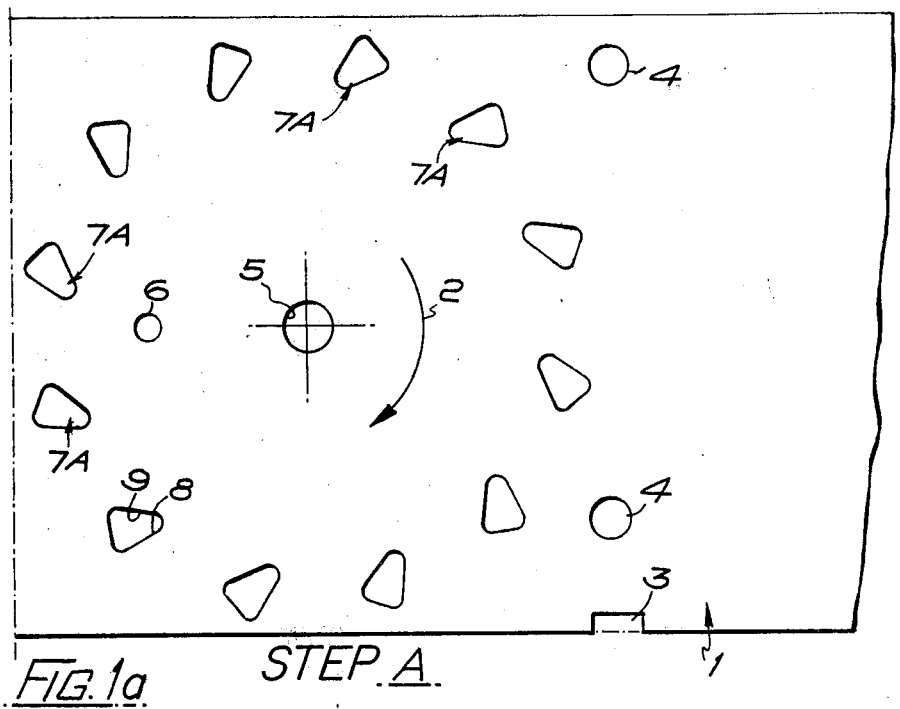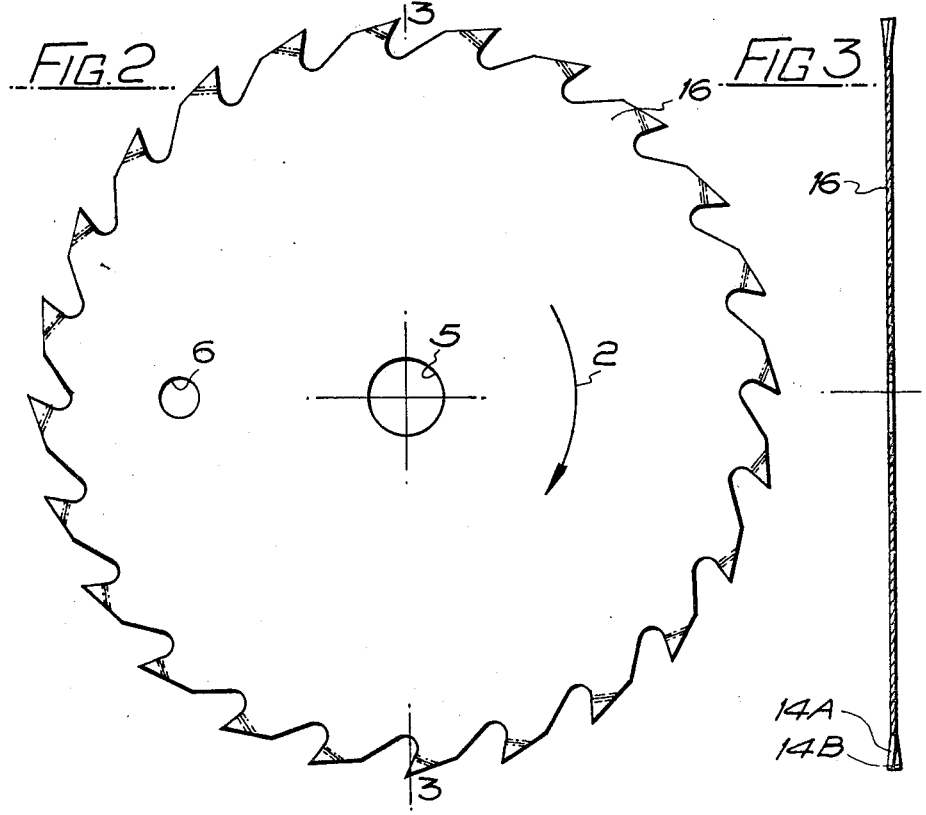

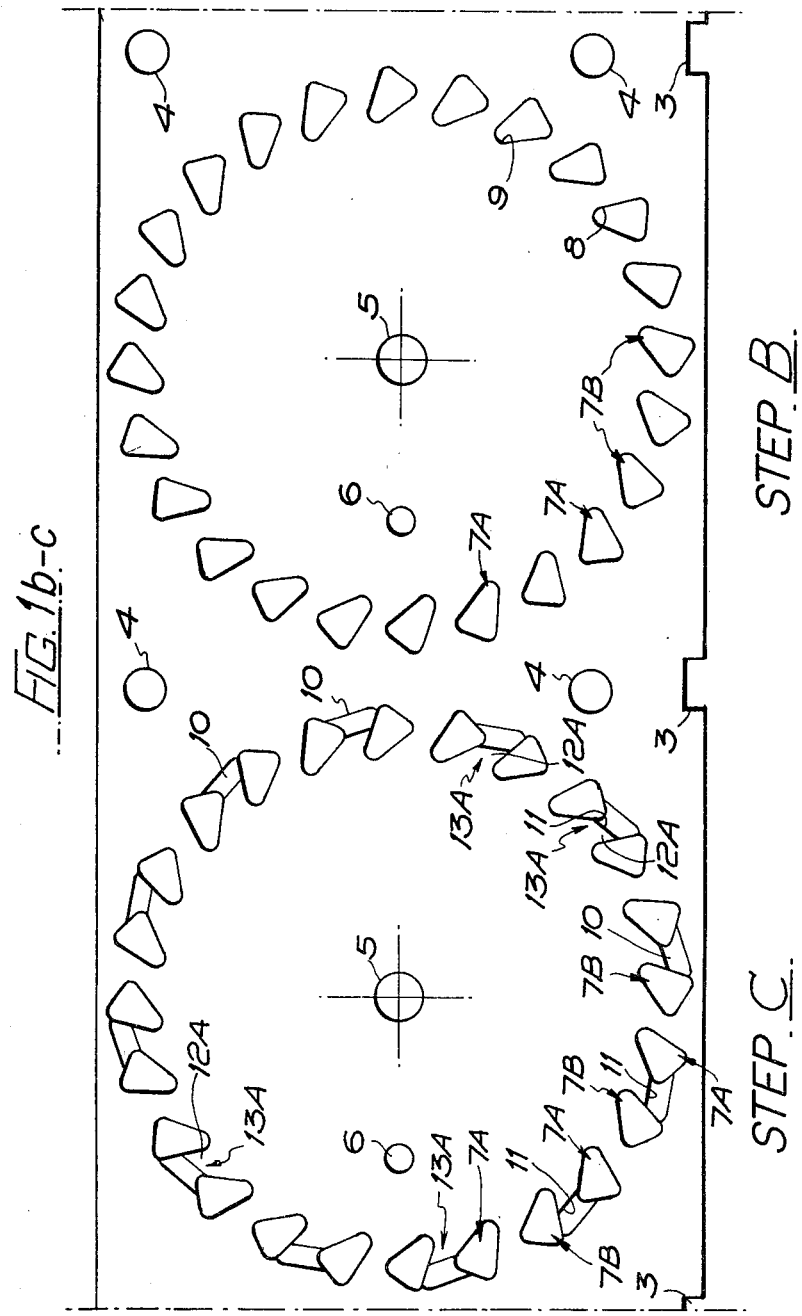

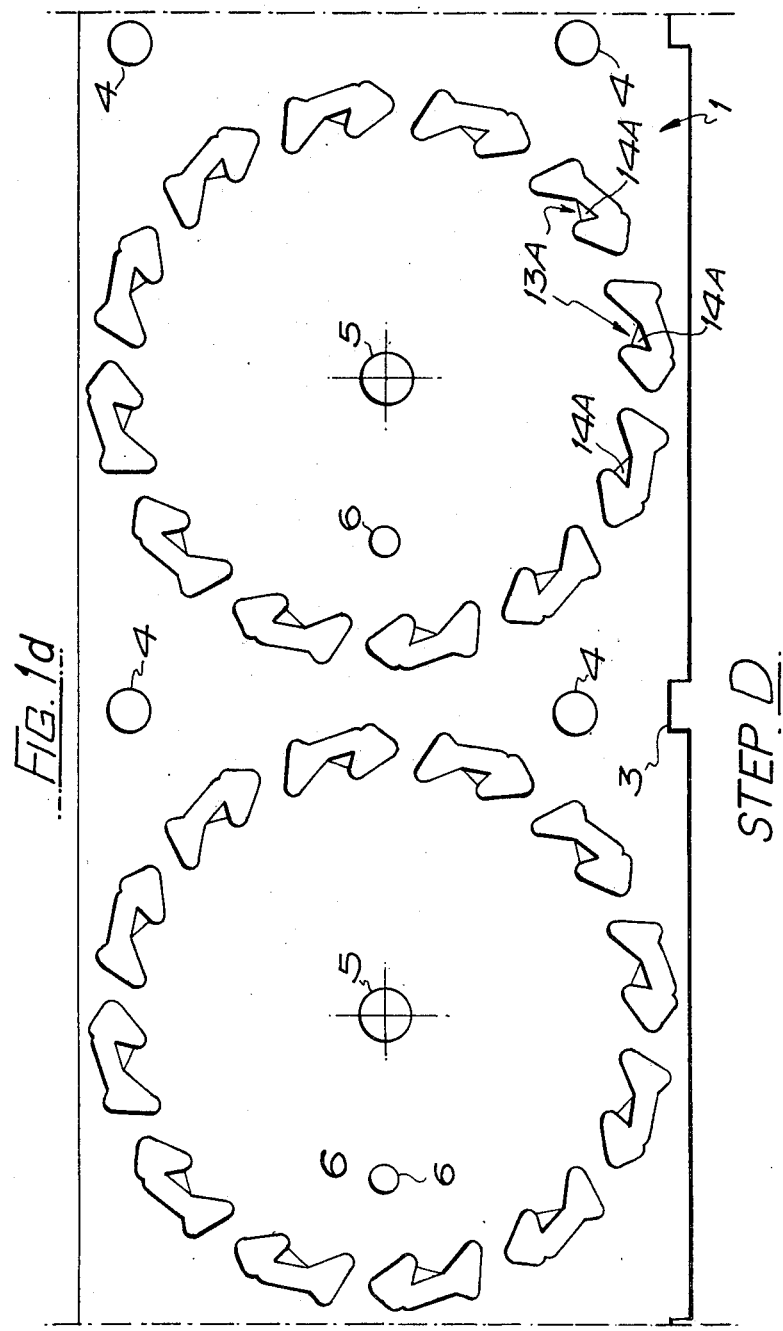

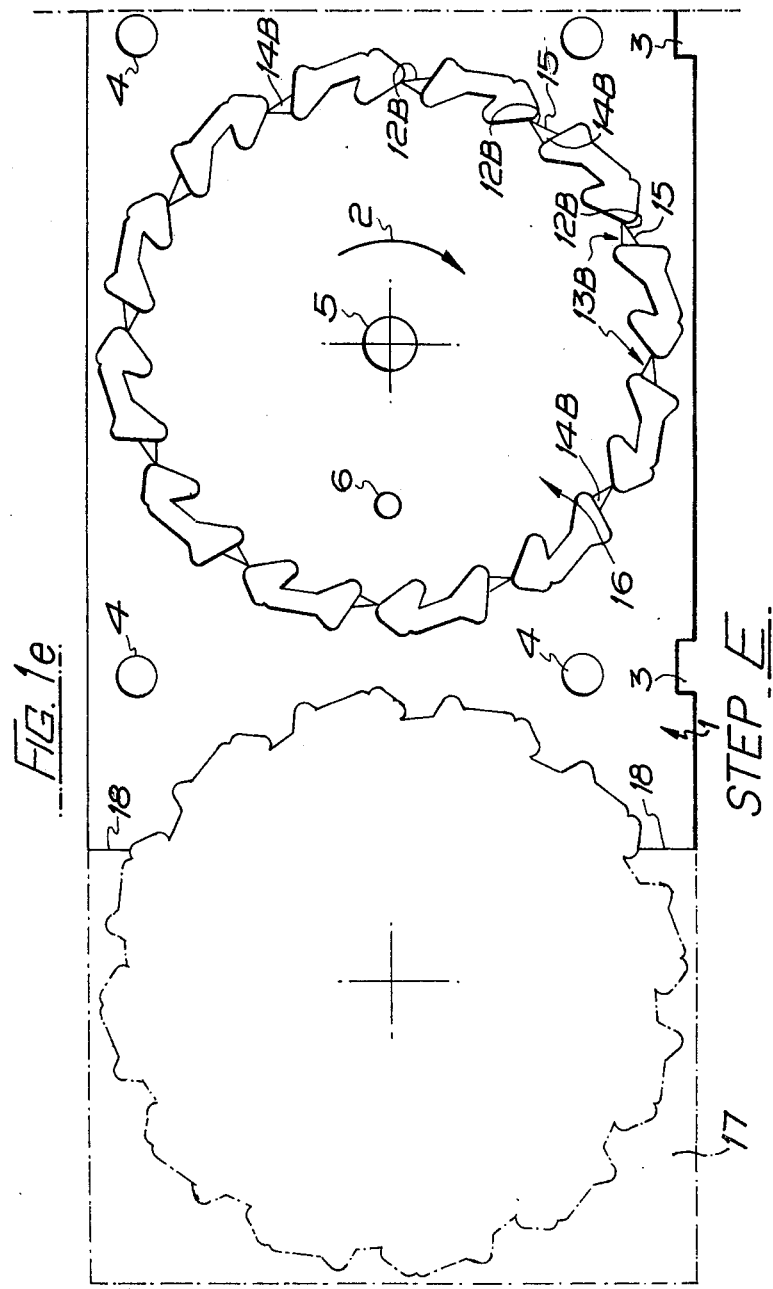

METHOD OF MAKING SAW BLADES

This invention relates to a method of manufacturing circular saw blades, of relatively small dimensions, e.g. 5" diameter, such as may be used for timber and other cutting operations, when attached to a powered tool which are hand held or static.

Such blades comprise basically, a central mounting hole, a drive hole and a plurality of peripheral teeth, and the conventional method of manufacture, is firstly to pierce the centre hole and the drive hole simultaneously, secondly, to blank out the overall diameter of the blade and thirdly, to index the blank blade in a press tool to notch out the peripheral teeth either individually, or possibly in small groups of two or three. There then follows a setting operation in which the teeth are individually set to the desired angle. Such individual tooth formation and setting involves a substantial amount of time in the manufacturing method, and attempts have been made in the past to find a practical method of blanking out the teeth in a press tool in large numbers, and the present invention concerns itself with the manufacturing method following this principle.

According to the present invention, a method of manufacturing a circular saw blade comprises advancing through a press tool having multiple blanking stations, a blank, in strip form of thickness required for the blades and of width slightly greater than the diameter required for the blades, and having the physical characteristics required of the blades, effecting a first blanking operation at a first blanking station to blank out leading edges of non-consecutive teeth simultaneously with trailing edges of preceding adjacent teeth, advancing the strip to at least one subsequent blanking station and blanking out identical edges of some or all of the remaining teeth, advancing the strip to a further blanking station and forming outer edges on some or all of the teeth and blanking a centre hole and a drive hole at one of the stations.

Thus, by employing the method of the invention, one obtains blades which are virtually completed from the manufacturing view point, for the only subsequent manufacturing step required is the grinding back of the top edges of the teeth.

Preferably, the non-consecutive teeth are alternate teeth, while at the subsequent blanking station it is preferred to blank out all the remaining teeth. A further preferred feature is to form the outer edges on the teeth in two stages, treating alternate teeth in the first stage and the remaining teeth in a second stage. By employing this two stage technique, one may in accordance with another preferred feature of the invention, impart set to the teeth simultaneously with forming the outer edges, the teeth of the first stage being set in the opposite direction to the teeth of the second stage.

Preferably, the centre hole and drive hole are blanked at the first station, and at the final station, where the blades are finally detached from the strip, one may arrange for the blades to fall to a suitable container, conveyor etc. Preferably, the strip is employed in continuous form, although strip in lengths e.g. of 2'6" could be fed into the press tool. However, with whatever form of strip is employed, the latter is preferably provided with location holes, spaced at regular pitch along the length of the strip, to ensure accurate location of the strip in the press tool. Thus, pairs of location holes may be provided, one adjacent each edge of the strip.

The invention also includes a circular saw blade manufactured in accordance with the present invention.

The invention will now be described in greater detail by way of example, with reference to the accompanying drawings in which:

FIGS. 1A–E shows the various manufacturing stages along a strip blank to form a blade; and FIGS. 2 and 3 show a finished blade.

In FIG. 1A–E, a continuous steel strip 1 e.g. of 144 mm if saw blades of 5" diameter are required, is fed into a press tool not shown, and five blanking stations indicated in FIGS. 1A–E as steps A to E are effected on the strip to produce saw blades (FIGS. 2 and 3) rotatable in the direction shown by arrow 2, which blade is finished apart from the need to grind back the top edges of the teeth in the known, conventional manner.

As station A (FIG. 1A), the edge of the strip 1 is notched at 3, a pair of spaced apart pilot holes 4 are pierced, as is a centre hole 5 and a drive hole 6. Simultaneously with these operations, twelve generally triangular holes 7A are pierced, each hole having a face 8 to constitute the leading edge of a non-consecutive tooth being formed and a face 9 to constitute a trailing edge of a preceding non-consecutive tooth being formed.

At station B (FIG. 1B–C), twelve generally triangular holes 7B are pierced intermediate the holes 7A so that identical edges of all the remaining teeth to be formed are blanked out.

At station C (FIG. 1B–C), twelve slots 10 are pierced to connect one hole 7A to one hole 7B with one face 11 of each slot constituting a top edge 12A of a tooth 13A.

At station D (FIG. 1D), the twelve teeth 13A are set by being bent, all in the same direction at their tips 14A, out of the general plane of the strip 1.

At the final station E (FIG. 1E), cuts 15 are effected to constitute a top edge 12B of each intermediate tooth 13B, while simultaneously, tips 14B of teeth 13B are set, in the opposite direction to that in which the tips 14A of teeth 13A are set so that a 24 tooth circular saw blade 16 is formed, shown as a finished blade in FIGS. 2 and 3. Also at this station scrap material, indicated in chain-dotted line at 17, is cropped from the succeeding strip 1 by cutting at 18. It may be arranged for the blades at Station E to fall from the strip 1 into a hopper etc. for conventional finishing e.g. by grinding back the top edges 12A, 12B of the teeth. It will be appreciated that the notch 3 and holes 4 are employed for location and/or guidance of the strip through the press tool. Advantageously the press tool employed for carrying out the method of the present invention is of sufficient capacity that a plurality, if not all stations A to E may be accommodated within a single press tool. With all stations so accommodated, every stroke of the press, after appropriate advance of the strip, results in the production of one virtually finished blade.

What I claim is:

1. A method of manufacturing a circular saw blade comprising advancing a blank in strip form of thickness required for said saw blade and of width slightly greater than the diameter required for said saw blade, and having the physical characteristics required of said saw blade through a press tool having multiple blanking stations, the method comprising effecting a first blanking operation on said blank at a first blanking station to blank out leading edges of non-consecutive teeth simultaneously with trailing edges of preceding adjacent teeth, advancing said blank to at least one subsequent blanking station and blanking out identical edges of some or all of the remaining teeth, advancing said blank to a further blanking station and forming outer edges on some or all of the teeth separate from forming the leading and trailing edges of said teeth, and blanking a centre hole and a drive hole at one of said stations.

2. A method of manufacturing a circular saw blade as claimed in claim 1 wherein said non-consecutive teeth are alternate teeth.

3. A method of manufacturing a circular saw blade as claimed in claim 1, wherein at said subsequent blanking station all the remaining teeth are blanked out.

4. A method of manufacturing a circular saw blade as claimed in claim 1, wherein outer edges on said teeth are formed in two stages, alternate teeth being formed in the first stage and the remaining teeth in the second stage.

5. A method of manufacturing a circular saw blade as claimed in claim 4, wherein set is imparted to the teeth simultaneously with forming said outer edges, said teeth of said first stage being set in the opposite direction to said teeth of said second stage.

6. A method of manufacturing a circular saw blade as claimed in claim 1, wherein said centre hole and said drive hole are blanked at said first station.

7. A method of manufacturing a circular saw blade as claimed in claim 1, wherein at a final blanking station forming some or all of said outer edges, said blades are detached from said strip.

8. A method of manufacturing a circular saw blade as claimed in claim 1, wherein said strip is provided with multiple location holes, spaced at regular pitch lengths along the length of said strip, to ensure accurate location of said strip in said press tool.

* * * * *